(12) United States Patent
Oh-Ide et al.

(10) Patent No.: US 6,233,030 B1
(45) Date of Patent: *May 15, 2001

(54) LIQUID CRYSTAL DISPLAY APPARATUS HAVING HIGH DEFINITION

(75) Inventors: Toshio Oh-Ide; Masakatsu Higa, both of Atsugi (JP)

(73) Assignee: Ricoh Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,835

(22) Filed: Feb. 9, 1998

(30) Foreign Application Priority Data

Sep. 1, 1995 (JP) .................................................. 7-248635

(51) Int. Cl.$^7$ .................................................. G02F 1/1335
(52) U.S. Cl. .......................... 349/99; 349/117; 349/118; 349/121; 349/96
(58) Field of Search ............................... 349/99, 96, 117, 349/118, 121

(56) References Cited

U.S. PATENT DOCUMENTS

| | | | | |
|---|---|---|---|---|
| 5,793,455 | * | 8/1998 | Nakamura | 349/96 |
| 6,023,317 | * | 2/2000 | Xu et al. | 349/120 |
| 6,115,095 | * | 9/2000 | Suzuki et al. | 349/117 |
| 6,137,556 | * | 10/2000 | Yamahara | 349/136 |
| 6,141,070 | * | 1/2000 | Kaneko | 349/117 |
| 6,144,431 | * | 1/2000 | Yamahara et al. | 349/117 |

\* cited by examiner

Primary Examiner—William L. Sikes
Assistant Examiner—Julie Ngo
(74) Attorney, Agent, or Firm—Oblon, Spivak, McClelland, Maier & Neustadt, P.C.

(57) ABSTRACT

A liquid crystal display apparatus includes first and second transparent substrates having optical anisotropy, a super twisted nematic liquid crystal body including liquid crystal molecules, an orientation device configured to urge the liquid crystal molecules to orient in a first direction in the inner surface of the first transparent substrate and in a second direction in the inner surface of the second transparent substrate, at least one phase retarder plate and at least one polarizing plate, wherein an angle between an absorption axis of the at least one polarizing plate and a direction of the largest refraction index of the at least one phase retarder plate adjacent to the at least one polarizing plate is 45°±22.5°, an angle between an absorption axis of the at least one polarizing plate and an orientation direction of the liquid crystal molecules in the inner surface of the second substrates adjacent to the polarizing plate is 45°±22.5°, a retardation value of the first and second substrates is less than 50 nm, an angle between a direction of the largest refraction index of the first substrate and an orientation direction of the liquid crystal molecules in the inner surface of the first substrate is within the range of −40° to 40°, and an angle between a direction of the largest refraction index of the second substrate and an orientation direction of the liquid crystal molecules in the inner surface of the second substrate is within a range of 50° to 130°.

6 Claims, 2 Drawing Sheets

LIQUID CRYSTAL DISPLAY APPARATUS HAVING HIGH DEFINITION

BACKGROUND OF THE INVENTION

1. Field of the Invention

The present invention relates to a liquid crystal display apparatus of the supertwisted nematic type (hereinafter, referred to as "STN-LCD") with a phase difference plate for color compensation, particularly a black-and-white STN-LCD which can be used in an OA (Office Automation) apparatus.

2. Discussion of the Background

In the field of liquid crystal display, the image quality of TN (twisted nematic) type liquid crystal displays has been improved. In a TN type liquid crystal display, nematic liquid crystal molecules have a twisted angle of 90° and a liquid crystal cell is sandwiched between a pair of polarizing sheets with their planes of polarization crossing or being parallel. By interposing a phase retarder between one of the polarizing sheets and the liquid crystal cell, the image quality of the TN type liquid crystal display can be improved as disclosed in Japanese patent publication 61-186937 and 60-26322.

To cope with the demands for an increased display capacity and an enlarged display screen, a super twisted nematic (generally called STN) type liquid crystal display have recently been developed. In an STN type liquid crystal display, the nematic liquid crystal molecules are twisted at an angle of about 180° to 270°. However, the STN type liquid crystal display suffers from "coloring" ascribed to birefringence of the liquid crystal molecules, resulting in a poor black-and-white display. In order to solve this problem, it has been suggested that a liquid crystal cell may be added to the STN type liquid crystal cell as an optical compensator, thereby eliminating the coloring and allowing a good black-and-white display. It has also been suggested that a liquid crystal cell may be combined with a phase retarder as an optical compensator, thereby eliminating the coloring and allowing a good black-and-white display. The phase retarder is a film or sheet having a birefringence character. Since a phase retarder has different refractive indices in two directions crossing at a right angle to each other, light transmitting through the phase retarder produces light rays whose planes of polarization make a phase difference.

In conventional liquid crystal display apparatus, a glass plate is predominantly used as a substrate of a liquid crystal display device. However, a plastic sheet is more preferred since it is light in weight, flexible and hard to break.

A glass plate has in general no optical anisotropy, its retardation value is therefore taken to be zero. However, the retardation value of a plastic sheet is non-zero because of the optically anisotropic nature of the plastic sheet, and usually gives rise to a retardation value in the order of 10 nm.

In an STN type liquid crystal display device, images are displayed by utilizing both rotation of plane of polarization and birefringence, which are induced by a layer of aligned liquid crystal molecules. Because of the polarization and rotation characteristics, the liquid crystal layer has its retardation value.

Accordingly, the STN type liquid crystal display devices with the glass substrate have difficulties such as a decreased brightness and contrast, and undesirable coloring. Furthermore, since a plastic substrate has a non-zero retardation value, as mentioned earlier, its retardation value is superimposed to those of the liquid crystal layer and other optical components, to thereby enhance the above-mentioned difficulties.

In order to obviate these difficulties, therefore, the axes of the optical components in the liquid crystal display device have to be arbitrarily aligned as will be detailed in the present disclosure. The axes of the optical components includes those of lower and upper plastic substrates, alignment treatment, lower and upper polarizing sheets, and phase retarder(s). j

SUMMARY OF THE INVENTION

An object of the present invention is to provide a liquid crystal display apparatus which is light in weight and hard to break and which has an excellent display.

The object of the present invention can be achieved by providing a novel liquid crystal display apparatus which includes first and second transparent substrates having optical anisotropy, a super twisted nematic liquid crystal body including liquid crystal molecules, an orientation layer device configured to urge the liquid crystal molecules to orient in a first direction in the inner surface of the first transparent substrate and in a second direction in the inner surface of the second transparent substrate, at least one phase retarder plate and at least one polarizing plate, wherein an angle between an absorption axis of the at least one polarizing plate and a direction of the largest refraction index of the at least one phase retarder plate adjacent to the at least one polarizing plate is 45°±22.5°, an angle between an absorption axis of the at least one polarizing plate and an orientation direction of the liquid crystal molecules in the inner surface of the second substrate adjacent to the polarizing plate is 45°±22.5°, a retardation value of the first and second substrates is less than 50 nm, an angle between a direction of the largest refraction index of the first substrate and an orientation direction of the liquid crystal molecules in the inner surface of the first substrate is within the range of −40° to 40°, and an angle between a direction of the largest refraction index of the second substrate and an orientation direction of the liquid crystal molecules in the inner surface of the second substrate is within a range of 50° to 130°.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
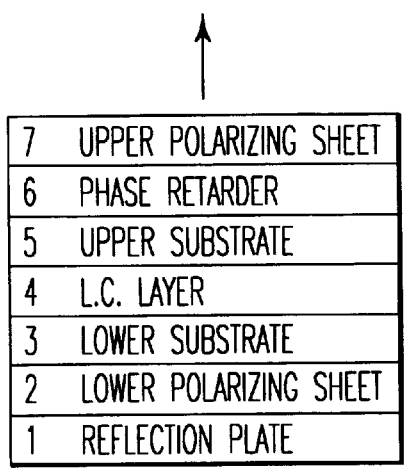
FIG. 1 shows a schematic structure of the liquid crystal display apparatus described in the preferred embodiments.

Various other objects, features and attendant advantages of the present invention will be more fully appreciated as the same becomes better understood from the following detailed description when considered in connection with the accompanying drawings in which like reference characters designate like or corresponding parts throughout the several views.

When liquid crystal molecules are twisted at an angle of 90° to 360° between these substrates, the liquid crystal display has high contrast.

A phase retarder plate may be placed between a lower substrate and a lower polarizing plate. Alternatively, two phase retarder plates may be used: one between an upper substrate and an upper polarizing plate and the other between a lower substrate and a lower polarizing plate.

When a direction of the largest refraction index of an upper substrate is 60°, a direction of the largest refraction index of a lower substrate is 120°, a luminosity index L* is 47.6, and chromaticity indexes a* and b* are −6.88 and −22.52, respectively, the liquid crystal was dark and showed much coloring.

When a direction of the largest refraction index of an upper substrate is 150°, a 0 direction of the largest refraction index of lower substrate is 30°, a luminosity index L* is 42.6, and chromaticity indexes a* and b* are −10.74 and 7.29, respectively, the liquid crystal display was dark and showed much coloring.

Figure 2:
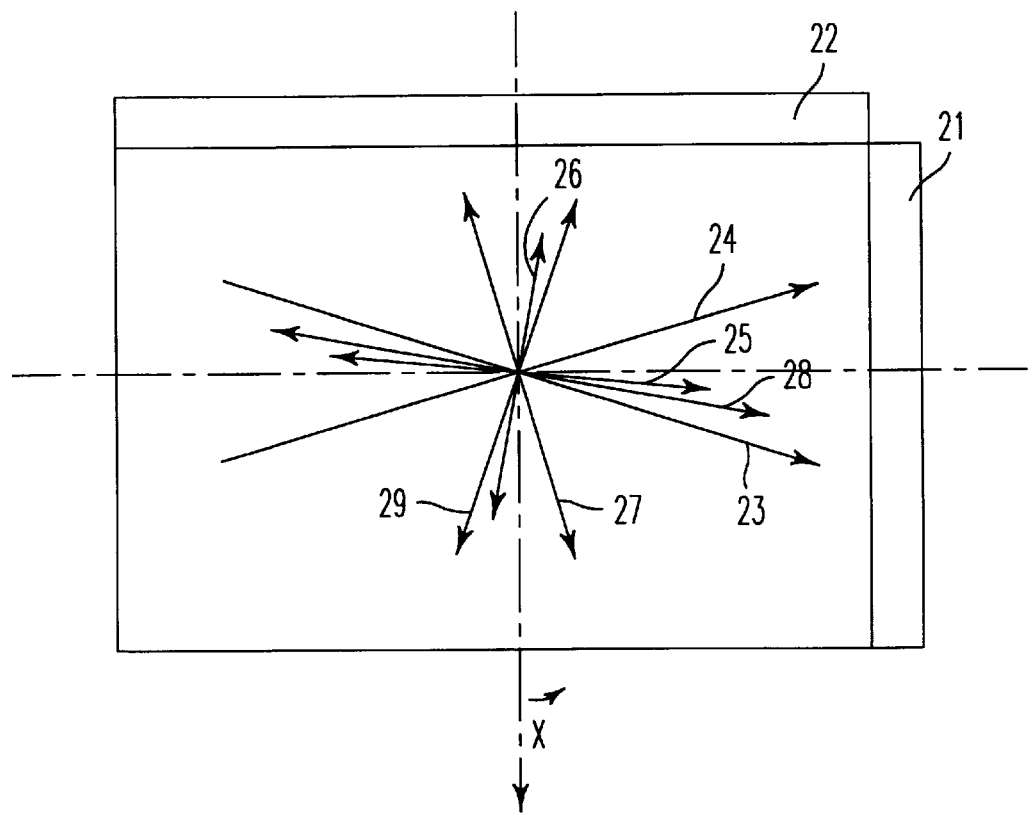
FIG. 2 shows the relative directions of the optical elements in the liquid crystal display apparatus described in the preferred embodiments.

In one of the experiments using the apparatus illustrated in FIGS. 1 and 2, Reference Numeral 1 refers to a reflection plate, and the substrates, the upper and lower substrates 21, 22, have a thickness of 150 μm and a retardation value of 20 nm. This retardation value was obtained by using Cauchy's dispersion formula at a wavelength of 550 nm. A space between these substrates is 6.7 μm and facilitates a liquid crystal layer 4. The thickness of an ITO film used in this experiment is 130 nm and is provided on the inner surfaces of the upper and lower substrates 21, 22. Liquid crystal molecules are twisted at an angle of 240° in the liquid crystal layer 4. A phase retarder plate 6 is a polycarbonate film whose thickness is 80 μm and whose retardation value is 580 nm. As shown in FIG. 2, X is an axis extending to the six o'clock direction. A direction of a light absorption axis 28 of the lower polarizing plate 2 makes 70° with respect to X. An orientation direction 24 of the liquid crystal molecules in the inner surface of the lower substrate 22 makes 120° with respect to X. An orientation direction 23 of the liquid crystal molecules in the inner surface of the upper substrate 21 makes 60° with respect to X. A direction of the largest refraction index 29 of the retarder plate 6 makes 150° with respect to X. A direction of a light absorption axis 27 of the upper polarizing plate 7 makes 15° with respect to X.

Figure 3B:
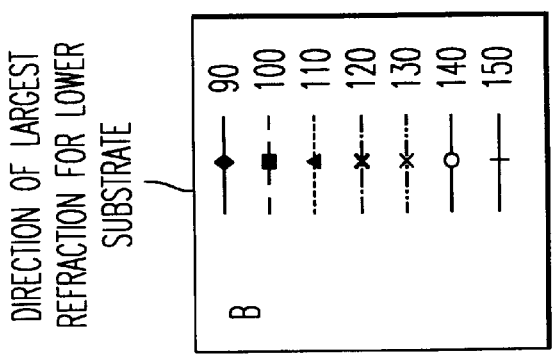
FIG. 3 is a graph showing the coloring effects of the liquid crystal display apparatus described in the preferred embodiments compared to a conventional liquid crystal display apparatus using glass substrates.
Figure 3A:
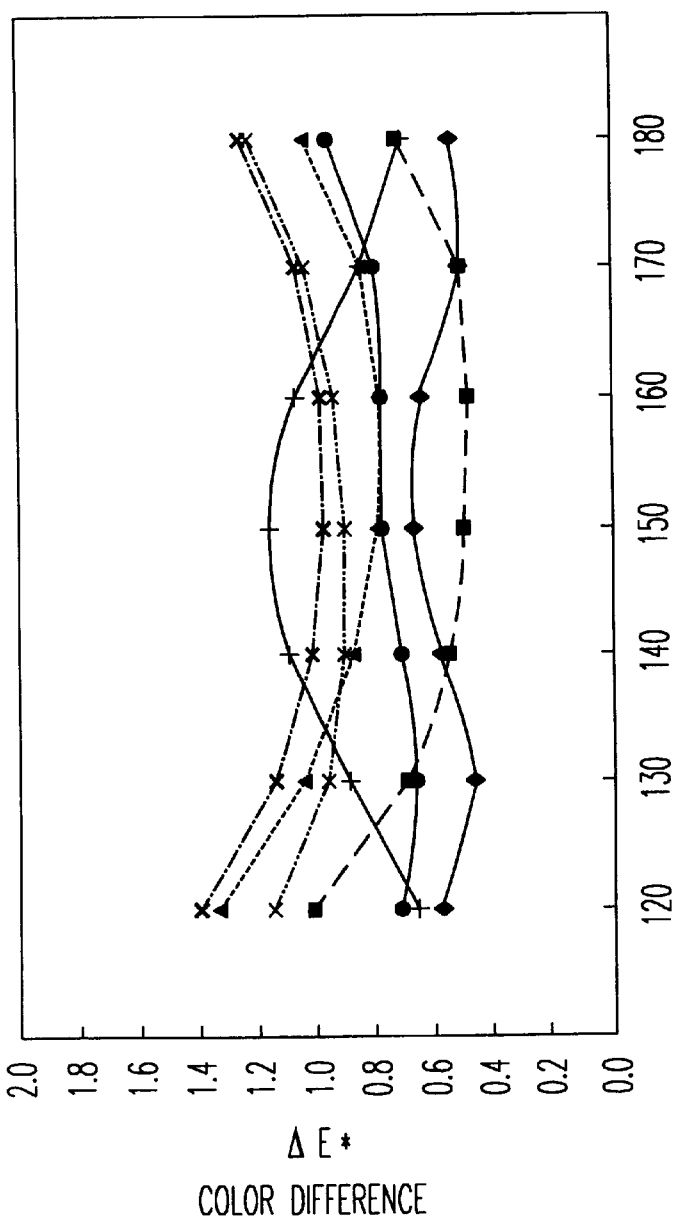

FIG. 3 shows ΔE* and the largest refraction index of the upper and lower substrates.

$$\Delta E^* = [(\Delta L^*)^2 + (\Delta a^*)^2 + (\Delta b^*)^2]^{1/2}$$

ΔL* is the difference between a luminosity index E from this experiment and a luminosity index E from a liquid crystal display having glass substrates. Δa* is the difference between a chromaticity index a from this experiment and a chromaticity index a from a liquid crystal display having a glass substrate. Similarly, Δb* is the difference between a chromaticity index b from this experiment and a chromaticity index b from a liquid crystal display having a glass substrate. When the angle between a direction of the largest refraction index 25 of the upper substrate 21 and X is 160° and the angle between a direction of the largest refraction index 26 the lower substrate 22 and X is 110°, a luminosity index L* is 59.8 and chromaticity indexes a* and b* are −4.50 and 10.46, respectively. This liquid crystal display has high contrast similar to a liquid crystal display having glass substrates, whose luminosity index L*, chromaticity indexes a* and b* are 60.1, −4.07 and 11.91, respectively.

When the angle between a direction of the largest refraction index 25 of the upper substrate 21 and X is 90° and the angle between a direction of the largest refraction index of the lower substrate 22 and X is 0°, the liquid crystal display has high contrast.

According to further experiments conducted by the inventors, when the angle between a direction of the largest refraction index of one substrate and an orientation direction of the liquid crystal molecules in the inner surface of the substrate is within the range of −40° to 40°, the liquid crystal display has high contrast.

When the liquid crystal molecules are twisted at an angle of 90° to 360° between these substrates, the liquid crystal display has high contrast.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display apparatus comprising:

first and second transparent substrates having optical anisotropy, said first and second transparent substrates being spaced apart substantially in parallel to each other to form a gap therebetween;

a super twisted nematic liquid crystal body comprising liquid crystal molecules and filling the gap between said first and second transparent substrates;

an orientation layer configured to urge said liquid crystal molecules of said super twisted nematic liquid crystal body to orient in a first direction in an inner surface of said first transparent substrate and in a second direction in an inner surface of said second transparent substrate, the first direction being more than 90° to said second direction;

at least one phase retarder plate disposed parallel to said first and second transparent substrates and outside the first or second transparent substrate; and at least one polarizing plate disposed parallel to said first and second transparent substrates and outside the first or second transparent substrate, wherein an angle between an absorption axis of said at least one polarizing plate and a direction of the largest refraction index of said at least one phase retarder plate disposed adjacent to the at least one polarizing plate is 45°±22.5°;

an angle between an absorption axis of said at least one polarizing plate and an orientation direction of the liquid crystal molecules in the inner surface of said second transparent substrate adjacent to the at least one polarizing plate is 45°±22.5°;

a retardation value of said first and second transparent substrates is less than 50 nm;

an angle between a direction of the largest refraction index of said first transparent substrate and an orientation direction of the liquid crystal molecules in the inner surface of the first transparent substrate is within a range of −40° to 40°; and an angle between a direction of the largest refraction index of the second transparent substrate and a direction perpendicular to the orientation direction of the liquid crystal molecules in the inner surface of the second transparent substrate is within a range of −40° to 40°.

2. The liquid crystal display apparatus of claim 1, wherein an angle between said direction of the largest refraction index of said first transparent substrate and said direction of the largest refraction index of the second transparent substrate is almost 90°;

the liquid crystal display apparatus has a rectangular form; and said direction of the largest refraction index of the first transparent substrate is parallel to one side of the rectangular form.

3. The liquid crystal display apparatus of claim 1 or 2, wherein said direction of the largest refraction index of said first transparent substrate is substantially parallel to said direction of the largest refraction index of the second transparent substrate.

4. A liquid crystal display apparatus comprising:

first and second transparent substrates having optical anisotropy, said first and second transparent substrates being spaced apart substantially in parallel to each other to form a gap therebetween;

a super twisted nematic liquid crystal body comprising liquid crystal molecules and filling the gap between said first and second transparent substrates;

an orientation layer configured to urge said liquid crystal molecules to orient in a first direction in an inner surface of said first transparent substrate and in a second direction in an inner surface of said second transparent substrate, the first direction being more than 90° to said second direction;

at least one phase retarder plate disposed parallel to said first and second transparent substrates and outside the first or second transparent substrate; and at least one polarizing plate disposed parallel to said first and second transparent substrates and outside the first or second transparent substrate, wherein an angle between an absorption axis of said at least one polarizing plate and a direction of the largest refraction index of said at least one phase retarder plate disposed adjacent to the at least one polarizing plate is 45°±22.5°;

an angle between an absorption axis of said at least one polarizing plate and an orientation direction of the liquid crystal molecules in the inner surface of said second transparent substrate adjacent to the at least one polarizing plate is 45°±22.5°;

a retardation value of said first and second transparent substrates is 20 nm and less;

an angle between a direction of the largest refraction index of said first transparent substrate and an orientation direction of the liquid crystal molecules in the inner surface of the first transparent substrate is within a range of −30° to 30°; and an angle between a direction of the largest refraction index of the second transparent substrate and a direction perpendicular to the orientation direction of the liquid crystal molecules in the inner surface of the second transparent substrate is within a range of −30° to 30°.

5. The liquid crystal display apparatus of claim 4, wherein an angle between said direction of the largest refraction index of said first transparent substrate and said direction of the largest refraction index of the second transparent substrate is almost 90°;

the liquid crystal display apparatus has a rectangular form; and said direction of the largest refraction index of said first transparent substrate is parallel to one side of the rectangular form.

6. The liquid crystal display apparatus of claim 4, wherein said direction of the largest refraction index of said first transparent substrate is substantially parallel to said direction of the largest refraction index of the second transparent substrate.

\* \* \* \* \*